(12) United States Patent
Bossen et al.

(10) Patent No.: US 6,243,823 B1
(45) Date of Patent: Jun. 5, 2001

(54) METHOD AND SYSTEM FOR BOOT-TIME DECONFIGURATION OF A MEMORY IN A PROCESSING SYSTEM

(75) Inventors: Douglas Craig Bossen; Alongkorn Kitamorn, both of Austin; Charles Andrew McLaughlin, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,955

(22) Filed: Oct. 2, 1998

(51) Int. Cl.[7] ............................ G06F 15/177; G06F 9/445
(52) U.S. Cl. ............................................ 714/2; 713/2
(58) Field of Search .................................. 714/2, 3, 5, 7, 714/8, 36, 42, 710; 713/1, 2; 365/200, 201; 711/104, 170

(56) References Cited

U.S. PATENT DOCUMENTS 5,732,281 * 3/1998 Summers et al. .
5,748,877 * 5/1998 Dollahite et al. .
5,844,910 * 12/1998 Niijima et al. .

\* cited by examiner

Primary Examiner—Gopal C. Ray
(74) Attorney, Agent, or Firm—Sawyer Law Group LLP; Leslie Van Leeuwen

(57) ABSTRACT

A method and system for deconfiguring software in a processing system is disclosed. In one aspect, a processing system comprises a central processing unit (CPU), and a memory coupled to the CPU. The memory includes a memory array and a memory controller for capturing information concerning the status of the memory array. The processing system includes a service processor for gathering and analyzing status information from the memory controller. The processing system also includes a nonvolatile device coupled to the CPU and the service processor. The nonvolatile device includes a deconfiguration area. The deconfiguration area stores information concerning the status of the memory array from the service processor. The deconfiguration area also provides information for deconfiguring at least a portion of the memory array during a boot time of the processing system. Accordingly, through the present invention, memory errors are detected during normal computer operations by error detection logic. This detection is utilized during any subsequent boot process by service processor and CPU boot firmware to deallocate the defective memory module. This is accomplished through the use of error status registers within the memory controller and through the use of a deconfiguration area in the nonvolatile device which provides information directly to the CPU boot firmware.

18 Claims, 4 Drawing Sheets

Memory General Record Format

| Byte | Description |
|---|---|
| 0-1 | RL: Record Length per Memory FRU (DIMM/card) |
| 2 | N: Maximum Number of Memory FRUs (DIMM/card) in the System when Fully Configured |
| 3-3+ (N*RL) | Specific Memory Record Data. The Remaining Fields of the Memory record Consists of N* RL-Byte Subrecords, One for each Possible Memory Unit (N is the Value in Bytes 2) |

FIG. 3

Memory Specific Record Format

| Byte | Bit | Description |
|---|---|---|
| 0 | | Memory Card Slot Number or ID |
| 1 | | DIMM Slot Number or ID on Memory Card |
| 2 | 0 MSB | Update Status for Byte 3: <br> 0=Byte 3 in this Record is Consistent with Memory VPD ZM-ER Field <br> 1=Byte 3 in this Record has been Updated by Either System or Service Processor Firmware |
| 2 | 1-3 | Reserved |
| 2 | 4-7 | Present & Current Configuration Status of this CPU: <br> 0x0 Not Present <br> 0x1 Present and Configured by System <br> 0x2 Present, Deconfigure by System (failure criteria met) <br> 0x3 Present and Manually Configured (regardless of run time failure criteria) <br> 0x4 Present and Manually Deconfigured (regardless of run time failure criteria) |
| 3 | | Fail Status (This Field also Used for the RR Value in the CPU 8-Digit Error Code) <br> 0x00 No Failure <br> 0x2R POST Failure <br> 0x3n Run-Time Unrecoverable Error, Isolate to this Unit <br> 0x4n Run-Time Unrecoverable Error, Isolate to a Bank of Memory Containing this Unit <br> 0x5n Run-Time Recoverable Error Threshold Exceeded (single bit ECC errors) <br><br> Note: n=Number of Failures of Thresholds Exceeded <br> R=Additional Reason Codes for POST Failures |
| 4-7 | | 4-Byte Containing the Value from JEDEC SPD Assembly Serial Number Byte 95-98. |
| 8-(8+y) | | y-Byte Value Containing the Memory DIMM Physical/Hardware Location Code (in ASCII form). <br> Note: The y Value is Platform Dependent. For Sphinx, y=8 |

FIG. 4

METHOD AND SYSTEM FOR BOOT-TIME DECONFIGURATION OF A MEMORY IN A PROCESSING SYSTEM

FIELD OF THE INVENTION

The present invention relates generally to processing systems and more particularly to deconfiguring memory at the boot-time of the processing system.

BACKGROUND OF THE INVENTION

Processing systems which include memories and processors oftentimes experience failures. Sometimes these failures are so-called hard errors, from which no recovery is possible. Thereafter the device that has caused the hard error is replaced. On the other hand, oftentimes failures are repeatable or so-called soft errors, which occur intermittently and randomly. Oftentimes these soft errors are repeatable and are localized to a particular memory module within the processing system.

However, it is oftentimes difficult to obtain information in existing conventional systems about the memory soft errors. Also, in conventional processing systems, memory modules are typically not deallocated from the system. Clearly, what is needed is a system for determining the cause of a repeatable or soft error and a system and method for deallocating the particular device associated with the soft error. The system must be easy to implement and cost effective, and should be easily implemented in existing systems. The present invention addresses such a need.

SUMMARY OF THE INVENTION

A method and system for deconfiguring memory in a processing system is disclosed. In one aspect, a processing system is disclosed that comprises a central processing unit (CPU), and a memory coupled to the CPU. The first memory includes a memory array and a memory controller for capturing information concerning the status of the memory array. The processing system includes a service processor for gathering and analyzing status information from the memory controller. The processing system also includes a nonvolatile device coupled to the CPU and the service processor. The nonvolatile device includes a deconfiguration area. The deconfiguration area stores information concerning the status of the memory array from the service processor. The deconfiguration area also provides information for deconfiguring at least a portion of the memory array during a boot time of the processing system.

Accordingly, through the present invention, memory defects are detected during normal computer operations by error detection logic. This detection is utilized during any subsequent boot process by service processor and CPU boot firmware to deallocate the defective memory module. This is accomplished through the use of error status and configuration registers within the memory controller chip and through the use of a deconfiguration area in NVRAM, which provides information directly to the CPU boot firmware.

BRIEF DESCRIPTION OF THE DRAWINGS

FIG. 3 is an example of the Memory General Record Format.

FIG. 4 is an example of the Memory Specific Record Format.

DETAILED DESCRIPTION OF THE INVENTION

The present invention relates to a method and system for deconfiguring memory at boot-time for a processing system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
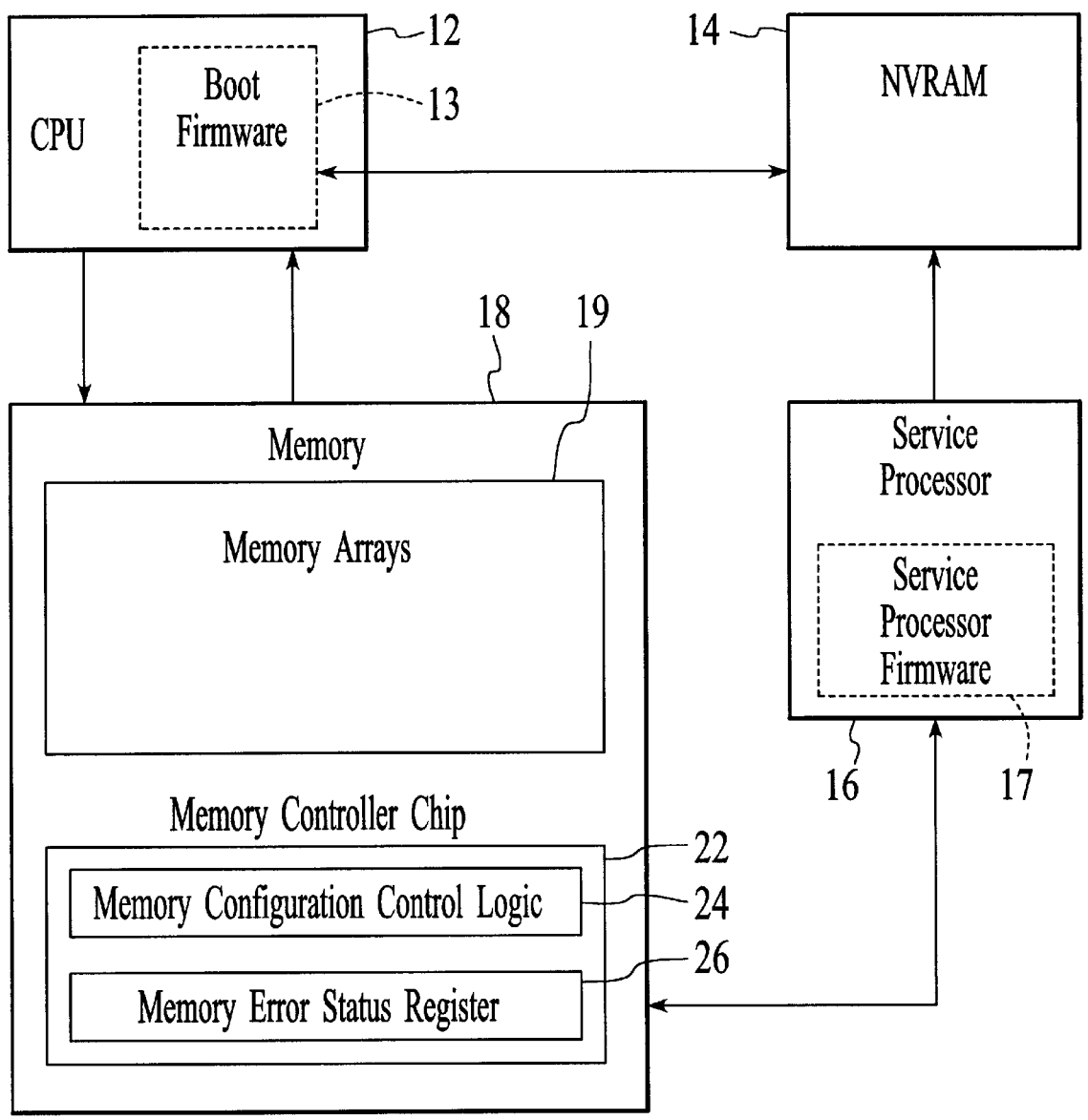
FIG. 1 is a block diagram of a conventional processing system.

FIG. 1 is a block diagram of a conventional computer processing system 10. As is seen, the conventional computer processing system includes a CPU 12, which has boot firmware 13 therewithin. The CPU 12 is in communication with a nonvolatile device such as a nonvolatile random access memory (NVRAM) 14 which contains information such as serial number and other identifying information within it and a memory 18. The memory 18 includes a memory array 19 which typically comprises a plurality of memory devices and includes a memory controller 22. The memory controller 22 typically includes memory configuration control logic 24, and memory status registers 26 respectively. The controller 22 also provides information to a service processor 16 concerning the status of the memory array 19. The service processor 16 includes service processor firmware 17 and is in communication with NVRAM 14 to provide information thereto. As has been before mentioned, when a portion of the memory array 19 has soft errors or recoverable errors that are affecting the performance of the processing system 10, the typical method for obtaining information about what is wrong with the memory array 19 is for the service processor firmware 17 to diagnose the problem within the memory array 19 when the processing system 10 is not operating.

Accordingly, the service processor firmware 17 would perform this diagnostic task when the CPU 12 is shut down. Heretofore, the typical manner of addressing the problem of repetitive soft errors was to shut down the processing system 10 and determine which part of the memory 18 is defective.

It is possible, however, that even if certain portions of the memory are shut down, the processing system 10 could still operate effectively. Accordingly, the present invention allows for the processing system to resume while deconfiguring those portions of the memory that are causing the repeatable soft errors.

Accordingly, through the present invention, memory defects are detected during normal computer operations by error detection logic. This detection is utilized during any subsequent boot process by service processor and CPU boot firmware to deallocate the defective memory module. This is accomplished through the use of error status and configuration registers within the memory controller chip and through the use of a deconfiguration area in the nonvolatile device, which provides information directly to the CPU boot firmware. To further describe the present invention in more detail, refer now to FIG. 2.

Figure 2:
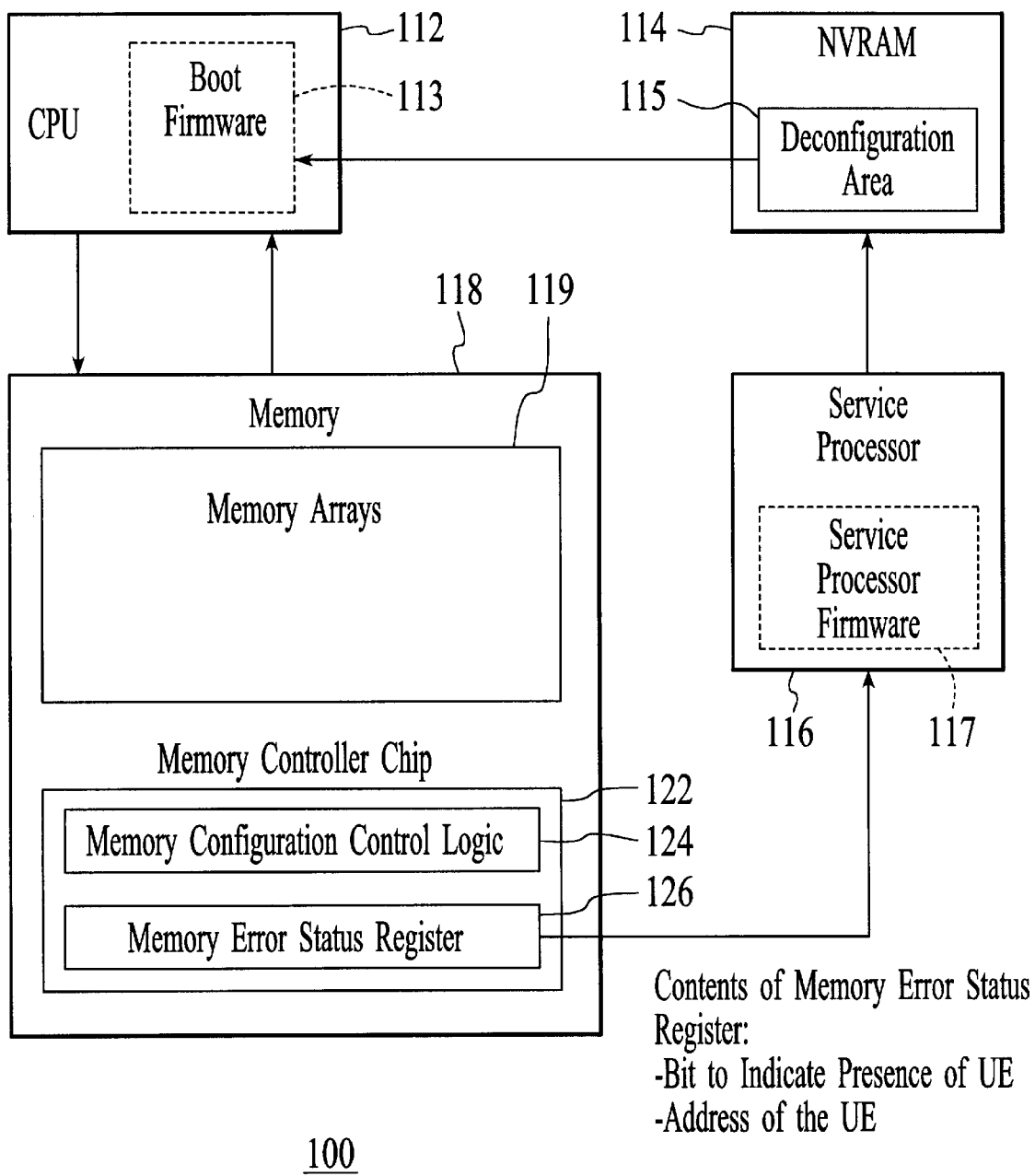
FIG. 2 is a block diagram of a processing system in accordance with the present invention.

FIG. 2 is a block diagram of a processing system 100 in accordance with the present invention. As is seen, some of the elements are similar to those shown in FIG. 1. However, the NVRAM 114 includes a deconfiguration area 115 which stores pertinent status information received from the service processor firmware 117. The service processor 117 and CPU boot firmware 118 will deconfigure certain portions of the memory array 119 based upon the information in the deconfiguration area 115. These error status and configuration registers 126 in addition to other functions also provide information to the service processor firmware 117 which allows the firmware 117 to provide the deconfiguration information to the deconfiguration area 115 of the NVRAM 114. The contents of the memory status register 126 that provide the indication to the service processor firmware 117 of a recoverable error is in a preferred embodiment, a bit to indicate the presence of unrecoverable error and address of the unrecoverable error which is provided by the memory configuration control logic.

A critical portion of the present invention is the deconfiguration area 115 of the NVRAM 114. The purpose of the deconfiguration area 115 is to store information concerning memory array 119 error status and configuration states. The deconfiguration area 115 should be flexible enough to allow modification to existing states and be able to handle the addition of new records. The deconfiguration area 115 and its initialization will be described in more detail hereinbelow.

The deconfiguration area 115 comprises a Memory General Record Format, and a Memory Specific Record Format.

FIG. 3 is an example of the Memory General Record Format. FIG. 4 is an example of the Memory Specific Record Format.

The deconfiguration area is initialized by the service processor firmware 117 as part of NVRAM 114 initialization process. The service processor firmware 117 initializes the deconfiguration area 115 as follows:

1. one Memory General Format Record
2. n Memory Specific Record Format, where n=maximum memory supported by the system
3. a memory deconfiguration area address pointer in the lower part of the mailbox-in buffer Each of the initialization values are described below.

Initialization Values

A. Memory General Record Format (FIG. 3)
1. Byte 0-1, RL=8+y, where y=maximum number of bytes to hold a memory FRU location code
2. Byte 2,N=maximum number of memory FRUs (DIMM or card) in the system when fully configured B. Memory Specific Record Format (FIG. 4)
1. Byte 0, memory card slot number or ID
2. Byte 1, memory slot number or ID
3. Byte 2-bit 0=0
4. Byte 2-bit 1-3=0
5. Byte 2-bit 4-7=0, if the FRU is not present, and=1 if the FRU is present
6. Byte 3, the ASCII value from memory VPD field converted to hex format
7. Byte 4-7, copy the value from memory
8. Byte 8-(8+y), the physical/hardware location code for this memory Another important feature of the present invention is the interaction of the service processor firmware 117 with the deconfiguration area 115.

1. Verify that all FRU serial numbers are consistent with the deconfiguration area 115 information. If a change is detected (new FRU installation, FRU removal or FRU swap), the information is updated.

2. The configuration status for each memory is updated based on prior run time fail status. This step is repeated for each memory that is present in the system as described below:

a. "Present & Current Configuration status" in the memory specific record format (FIG. 4) is read (byte 2, bit 4–7),
   if value=1, update required, go to step b below.
   if value=2 or 4 (deconfigured), no update required.
   if value=3, manually configured by user, no update required.
b. "Fail Status" (byte 3) is read, if one of the following criteria is met, change "Present & Current configuration status" (byte 2, bit 4-7) to deconfigured (2),
   if value=0x3n or –x4n, where n=2 or greater.
   if value=0x5n or 0x6n, where n=1 or greater.

Once a memory is deconfigured it remains off-line for subsequent reboots until the memory module is replaced or the user manually brings the memory back on-line.

Accordingly, through the present invention, memory defects are detected during normal computer operations by error detection logic. This detection is utilized during any subsequent boot process by service processor and CPU boot firmware to deallocate the defective memory module. This is accomplished through the use of error status registers within the memory controller and through the use of a deconfiguration area in the nonvolatile device, which provides information directly to the CPU boot firmware.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A processing system comprising:
    a central processing unit (CPU);
    a memory coupled to the CPU; the memory including a memory array and a memory controller for capturing information concerning the status of the memory array;
    a service processor for gathering and analyzing status information from the memory controller; and
    a nonvolatile device coupled to the CPU and the service processor; the nonvolatile device including a deconfiguration area, the deconfiguration area stores information concerning the status of the memory array from the service processor, the deconfiguration area providing information for deconfiguring at least a portion of the memory array during a boot time of the processing system.

2. The processing system of claim 1 wherein the nonvolatile device comprises a nonvolatile random access memory (NVRAM).

3. The processing system of claim 1 wherein the memory controller includes memory status registers.

4. The processing system of claim 3 wherein the service processor includes service processor firmware.

5. The processing system of claim 4 wherein a state of the memory status registers provide the information to service processor firmware of the status of various portions of a first memory.

6. The processing system of claim 1 wherein the deconfiguration area comprises a Memory General Record Format and a Memory Specific Record Format.

7. A method for deconfiguring memory in a processing system; the processing system comprising a central processing unit (CPU); a memory coupled to the CPU; the memory including a memory array and a memory controller for capturing information concerning the status of the memory array; a service processor for gathering and analyzing status information from the memory controller; and a nonvolatile device coupled to the CPU and the service processor; the method comprising:

providing a deconfiguration area within the nonvolatile device, the deconfiguration area for storing information concerning the status of the memory array from the service processor, the deconfiguration area for providing information for deconfiguring at least a portion of the memory array during a boot time of the processing system.

8. The method of claim 7 wherein the nonvolatile device comprises a nonvolatile random access memory (NVRAM).

9. The method of claim 7 wherein the memory controller includes memory status registers.

10. The method of claim 9 wherein the service processor includes service processor firmware.

11. The method of claim 10 wherein a state of the memory status registers provide the information to service processor firmware of the status of various portions of a first memory.

12. The method of claim 7 wherein the deconfiguration area comprises a Memory General Record Format and a Memory Specific Record Format.

13. A method for deconfiguring memory in a processing system, the processing system comprising a central processing unit (CPU); a memory coupled to the CPU; the memory including a memory array and a memory controller for capturing information concerning the status of the memory array; a service processor for gathering and analyzing status information from the memory controller; and a nonvolatile device coupled to the CPU and the service processor; the method comprising the steps of:

a) providing a deconfiguration area in the nonvolatile device;

b) receiving information concerning the status of the memory array from the service processor to the deconfiguration area; and c) providing information for deconfiguring at least a portion of the memory array from the deconfiguration area to the CPU during a boot time of the processing system.

14. The method of claim 13 wherein the nonvolatile device comprises a nonvolatile random access memory (NVRAM).

15. The method of claim 13 wherein the memory controller includes memory status registers.

16. The method of claim 15 wherein the service processor includes service processor firmware.

17. The method of claim 16 wherein a state of the memory status registers provide the information to service processor firmware of the status of various portions of a first memory.

18. The method of claim 13 wherein the deconfiguration area comprises a Memory General Record Format and a Memory Specific Record Format.

* * * * *